March 22, 1960

S. BRYAN ET AL 2,929,679

AIRCRAFT LOAD AND BALANCE COMPUTER

Filed March 28, 1957

INVENTORS:
SAMUEL BRYAN &
GILBERT NIELSEN

BY Homer R. Montague
ATTORNEY

March 22, 1960  S. BRYAN ET AL  2,929,679
AIRCRAFT LOAD AND BALANCE COMPUTER
Filed March 28, 1957  2 Sheets-Sheet 2

INVENTORS.
SAMUEL BRYAN &
GILBERT NIELSEN
BY Homer R. Montague
ATTORNEY

United States Patent Office 2,929,679

Patented Mar. 22, 1960

2,929,679

AIRCRAFT LOAD AND BALANCE COMPUTER

Samuel Bryan, Silver Spring, and Gilbert Nielsen, District Heights, Md., assignors to L.E.E., Inc., a corporation of Maryland Application March 28, 1957, Serial No. 649,026

3 Claims. (Cl. 235—61)

This invention pertains to computers, and particularly to a highly simplified and efficient analog computer for determining the proper distribution of cargo load elements in the loading of an aircraft, as well as giving an automatic summation of the load elements.

In the operation of loading an aircraft, and especially in the case of large cargo aircraft, there are three important factors which must be taken into consideration if the craft, when loaded and ready for take-off, is to have desirable flight characteristics. First, the load, which is usually made up of a considerable number of different cargo items, must be so distributed that the effective center of gravity (centroid) of the load or cargo is not too far from the desired centroid of the loaded craft as a whole; otherwise, the craft may be made unstable in flight, or difficult to keep in trim by the manipulation of the usual flight controls. Second, the total weight or gross load represented by the cargo must not exceed some allowable value, in pounds, tons or other weight units. This allowable value is to a degree dependent upon other considerations, for example the fuel load, but may be taken as given for the purposes of this invention. Third, the unit load per square foot or other unit of cargo space must not exceed some limiting value determined by the construction of the airframe.

It is common practice, in the loading of cargo aircraft, to plan the distribution of the various cargo items in terms of the weights of these items and their estimated positions in the loaded craft, the positive or negative moment of each item being added algebraically to a running total, the aim being to finish the operation with a balanced load, or at least one sufficiently balanced that minor corrections can be made by slight shifts in the positions of certain of the parts of the shipment. At the same time, a running total weight is calculated to ensure that the gross load figure is not exceeded. In the case of concentrated loads, which might exceed the unit load factor, pallet mounting or equivalent distribution schemes are utilized.

Since the whole computation, especially in the case of large craft and shipments including numerous items of cargo, is tedious and time-consuming, many efforts have been made to devise some automatic or semi-automatic scheme for making the calculation. While the mathematical problem is not a difficult one, usual computer techniques have always resulted in equipment which is excessively complicated and expensive, and moreover which is not well suited to the demands of actual field operation. For maximum utility, the computer should not require any power supply, it should be substantially self-explanatory in operation, for use by relatively unskilled personnel, and it should provide an answer, to the desired degree of precision, without the necessity of paperwork or waiting time. Finally, the computer should enable the user to note immediately the effect of the disposition of a particular piece of cargo in a certain location, with respect to the items already placed, in order to permit accurate final balancing of the entire load.

The present invention provides a simple and rugged analog computer meeting all of the above objects, at low cost, and in a configuration which adapts it well to the requirements of use at airfields or terminals. Essentially, the invention comprises a form of balance akin to the usual analytical balance of the laboratory, but of ruggedized construction for field usage, and including several special features which facilitate the special use to which it is applied. Thus, the main balance arm of the device is provided with notches or serrations defining by their spacing the unit of length or distance proportional to some convenient unit of cargo position in the plane. These serrations receive the pivot pins of balance "pans," several of which are provided to correspond to the cargo items, and which pans are adapted to receive weights forming the proportional analogs of the actual weights of cargo items. Thus, by adjusting the loadings and positions of the balance pans, actual balancing of the load is readily achieved. This particular analog, in which weights are represented by weights, and distances by distances, makes for a very graphical presentation, in that the adjustment of any particular cargo item to achieve balance is directly indicated to the user, without any mental or other calculation.

The invention also includes a feature providing a running total of the gross load, as distinguished from the net of the sum of moments. To this end, the main beam of the balance is itself pivoted upon a support which is spring mounted, so that the deflection of the spring mount is proportional to the gross cargo load at any step in the load computing process. By means of a dial indicator, suitably calibrated and tared for the weight of the beam itself, the running total cargo weight can be constantly observed.

In cargo aircraft of large capacity, the point on the fore-and-aft axis about which the cargo should be balanced will not ordinarily be a fixed location, but will depend upon the gross cargo weight. Thus, for example, with low gross loads, the balance point will be relatively nearer the tail, while as the gross cargo weight approaches the capacity of the craft the proper balance point will move forward. In a modified form of the invention disclosed herein, provision for this shifting of the balance point is included, permitting balancing of the load about the proper axis for a given total weight.

Finally, the invention provides automatic protection against the too-close spacing of cargo items, because of the size of the loaded pan assemblies, such that no two pans can be placed on the beam closer than a certain amount. Thus, unlike many types of computers, it would be impossible to achieve balance with a combination of load items exceeding the structural strength of the plane.

The way in which the invention satisfies all of the above objects of the invention will best be understood by referring now to the following detailed specification of a preferred embodiment of the invention, taken in connection with the accompanying drawings, in which.

Figure 1:
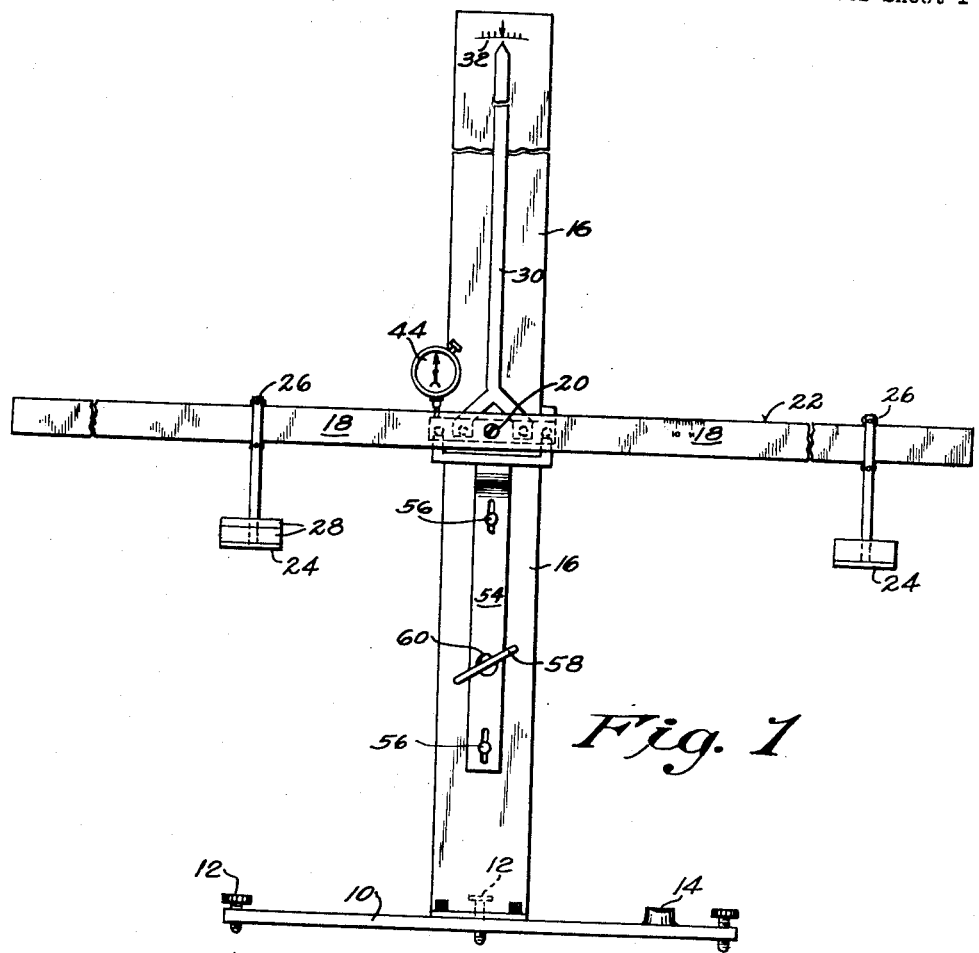
Fig. 1 is a front elevational view of the complete apparatus.

The preferred form of the novel computer shown in the drawings can be constructed of various materials, but for field usage it is made readily demountable into parts of convenient size for stowage in a case. The larger metal parts are preferably of aluminum or other light but strong material.

As shown, a base plate or table 10 is provided with levelling screws 12, desirably three in number, and a bubble level 14. Secured at or near the center of the table is the strong column 16 which may be a hollow member of rectangular section. This column supports, through a gross weight totalizer to be described below, a main balance beam 18 pivoted at its midpoint by pivot 20. The upper edge of the beam is transversely grooved as at 22, at close intervals designating a convenient unit of distance from the centroid of the airplane; for example, at intervals corresponding to 6 inches, a foot, or other unit.

A plurality of balance pans 24 are provided, each adapted to be slung from the upper edge of beam 18 by a pin bearing 26 held in a selected notch 22 to provide a low-friction suspension. A set of weights such as those designated 28 is also provided to permit loading the pans in convenient units; for example, in units of 100 pounds of cargo. Both weights and distances are correspondingly scaled, so that the total height of the balance, for example, may be of the order of two feet. The unloaded pan weight may correspond to one weight unit of cargo, for automatic tare correction.

Secured to the beam 18, and extending upwardly therefrom, is the long pointer 30, cooperating with a zero center scale 32 on column 16 to indicate when a balance of moments has been achieved. It will be noted that since the closeness of spacing of pans is limited by their size, and since the weight each can carry is limited by the length of its suspension arm, no combination representing more than a certain maximum load per square foot can be achieved. This acts as a warning against excessive concentration of weight in one area, regardless of the satisfaction of the equal moments criterion. Only two pans are illustrated in Fig. 1, but any desired or needed number will actually be employed.

Figure 2:
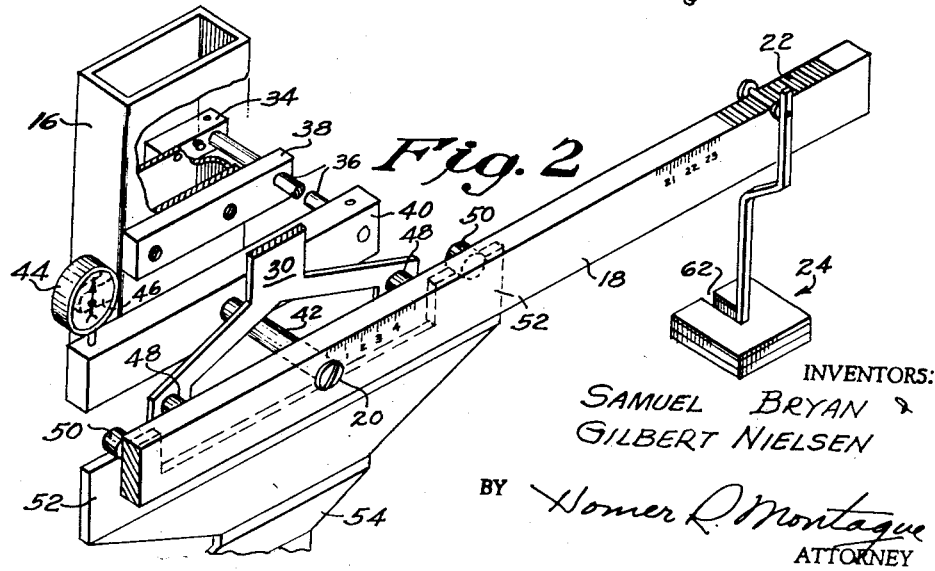
Fig. 2 is a fragmentary exploded perspective view of the essential mechanical parts of the device.

Fig. 2 illustrates the essential mechanical parts in greater detail, including the provision for weight totalizing. The latter function is attained by, in effect, weighing the entire beam 18 together with its pans and weights. As shown, the rear face of column 16 has firmly secured thereto a block 34 in which is splined or pinned one end of a torsion bar spring 36 extending forward (alongside the face of the column) and freely journalled in a second block 38 secured as to the front column face. The forwardmost end of torsion spring 36 is pinned or splined in one end of a beam supporting bar 40, which is thus resiliently held by the spring in a generally horizontal position.

At an intermediate point on bar 40 is mounted the axle 42, which extends forward and forms the balance pivot for beam 18. A screw 20 holds the beam in place, while permitting its removal for stowing. Torsion spring 36 thus supports the beam, pan and weight assembly, and its deflection is measured by a dial indicator 44 mounted on column 16 by a bracket 46. The indicator pin rests on the end of bar 40, and the indicator is preferably provided with its own zero adjustment to correct for the weight of the beam 18, which does not represent any cargo weight.

The pointer 30 is secured to beam 18 by straddling the pivot axle 42, for good rigidity, as upon studs or bosses 48.

To remove the beam and pan load from the axle 42 between adjustments, and for protection against damage, bumper studs 50 are secured to the rear beam face. These may be engaged by the lugs 52 on a slide 54 operating vertically on the front face of column 16 as by means of slots and shoulder screws 56. When handle 58 is turned, an eccentric 60 thereon moves the slide either to assume the weight of the beam assemblage, or to leave it free to indicate weight and balance.

The weights 28 of lead or type metal, are slotted as at 62 for convenient addition to the pans, and may be marked with the cargo weights they respectively represent. The beam serrations may also be calibrated.

The form of the invention described above is entirely suitable for many types of aircraft. Where, however, the aircraft is of the large cargo type, desirable flight characteristics require balancing the load about a fore-and-aft position whose location in turn depends upon the gross weight of the cargo. This factor is readily taken into account by a preliminary analog calculation which can be automatically applied to the form of computer now to be described.

Figure 3:
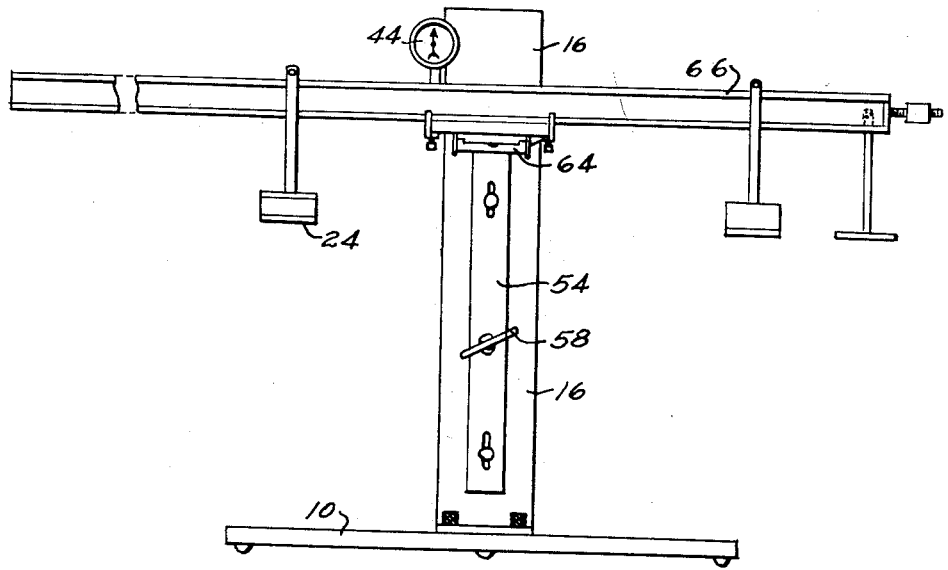
Fig. 3 is a view, similar to Fig. 1, of a modified form of the invention.
Figure 4:
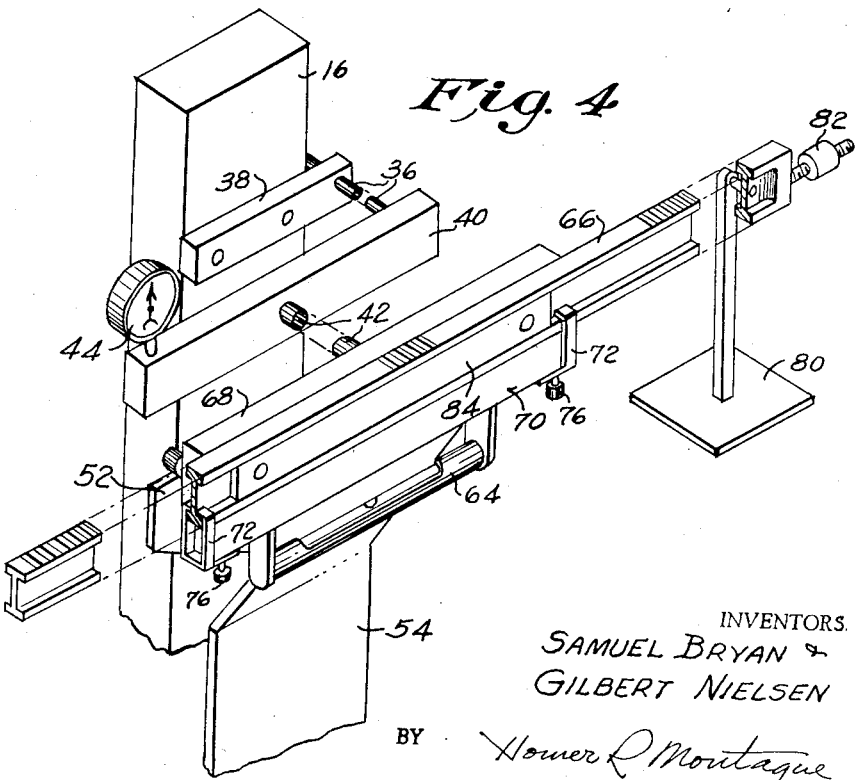
Fig. 4 is an enlarged exploded perspective view, with parts broken away for clarity, of a portion of the device of Fig. 3.

In Figs. 3 and 4 of the drawings, which illustrate this refinement of the invention, similar reference numerals have been used for parts already described. Also, as will be noticed from the drawings, the device has been reduced in height by eliminating the pointer 30.

Since the criterion of balance is whether beam 18 is balanced, it is unnecessary to provide a strictly level base 10 and strictly vertical column 16, together with a pointer for indicating when the beam is perpendicular to the column. It will be sufficient to provide the beam itself with an ordinary bubble level 64. This permits elimination of the pointer, the upwardly extending portion of the column, the level 14 on the base 10, and the leveling screws 12. As so modified, the device will operate on any reasonably level support or even on the ground. This simplification is obviously applicable to the form of the invention shown in Figs. 1 and 2.

Figs. 3 and 4 additionally provide for shifting the effective balance point of the beam away from its own center. To this end, a sliding beam arrangement is provided, as will be seen in Fig. 4. Here, the torsion bar spring 36 and its supports, the deflecting arm 40, and main balance pivot 42 are as earlier described. Now, however, the pivot axle 42 is not connected directly to the beam 66, but instead it pivotally supports a bracket 68 having a milled groove providing a support lip 70 for sliding endwise adjustment of beam 66, which is preferably of I-beam cross-section. Bracket 68 carries beneath it a bubble level 64 as described, and a pair of spaced yokes 72 have their upper angular ends arranged to bear upon the lower flanges of the beam. A thumbscrew 76 in each yoke engages the underside of the bracket 68, so that when the screws are tightened the beam will be secured in its lengthwise adjusted position.

In the particular arrangement shown, the beam 66 is intended to be displaced to the left to effect the desired shift of the pivot point along the beam. Since the balance would not operate correctly with such a shift, the dead load of the beam itself not being balanced, provision is made at the right end of the beam to provide auxiliary weight to bring the beam itself (without any scale pans in place) to a balanced condition. Thus, there is pivotally secured to the right end of the beam a pan 80 upon which weights may be placed to balance the beam, and a travelling weight 82 is also provided, on a threaded shaft extending from the beam 66, for fine adjustments.

The amount of displacement of the balance point will depend upon the gross cargo weight and the type of plane to be loaded. The necessary offset can be computed or read from charts pertinent to a particular type of craft, or a removable scale 84 for each craft type may be provided to fit in the recessed front face of the beam 66. Suitable scales and corresponding fiducial marks therefor may be provided on the beam edges and on the face of lip 70 of bracket 68. In any event, this form of the invention will normally include the locking arrangements (slide 54 and associated parts) as in the previously described form of the invention. Once the proper balance point for the beam has been established, the computer operates in the same manner as in the previous example.

While the invention has been described in detail in connection with certain presently preferred forms, vari-

What is claimed is:

1. An analog computer for determining the distribution of cargo loads and positions to provide a balance of moments about an axis, comprising a balance beam, a plurality of balance pans each provided with bearing means for suspending the same from said beam, means connected to said beam for indicating the balance condition thereof, a resilient suspension for said beam, and means for indicating continuously the deflection of said suspension to indicate the gross weight of said beam and said balance pans; said resilient suspension including a torsion bar displaced from the pivot axis of said beam, a rigid member connected to one end of said torsion bar, and a balance pivot for said beam carried on said member.

2. The invention in accordance with claim 1, in which said member is formed to provide an endwise sliding support for said beam, and means for releasably clamping said beam to said member.

3. The invention in accordance with claim 2, including auxiliary balancing means on said beam for balancing the same in any selected endwise position thereof.

References Cited in the file of this patent

UNITED STATES PATENTS

| | | |
|---|---|---|
| 517,698 | Kelly | Apr. 3, 1894 |
| 2,391,243 | Hutton | Dec. 18, 1945 |
| 2,393,162 | Hayes | Jan. 15, 1946 |